Aug. 27, 1968  T. G. KOPLOCK  3,398,673
CLARIFIER
Filed Oct. 24, 1965
FIG.1
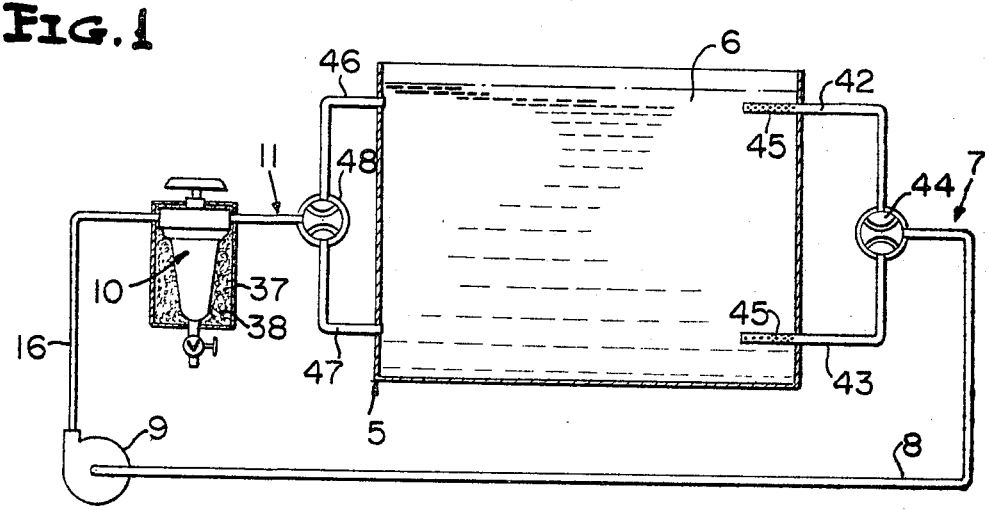
FIG.2
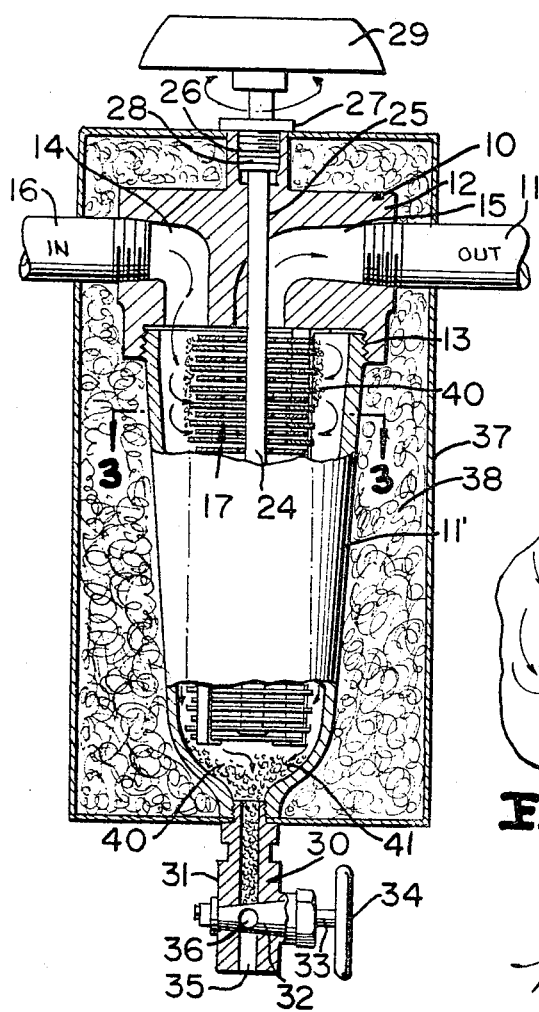
FIG.3
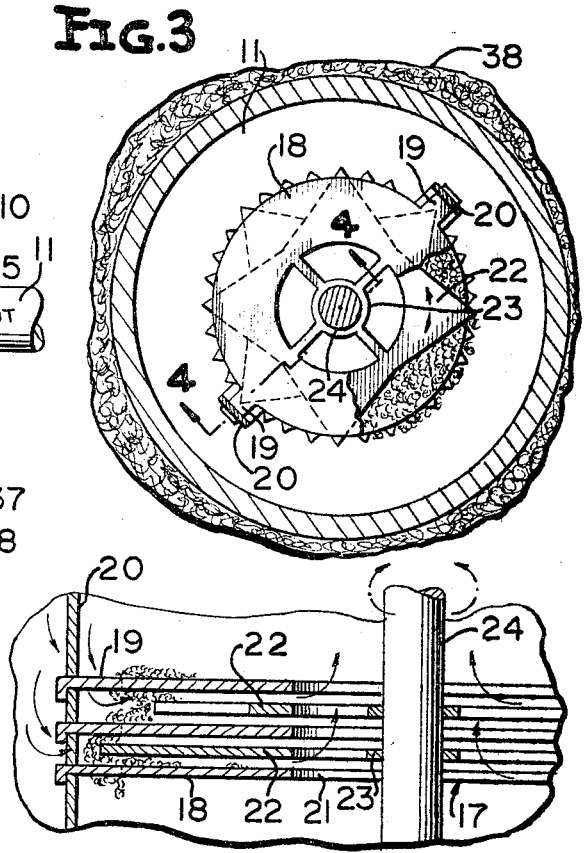
FIG.4
INVENTOR
THOMAS G. KOPLOCK
BY Mason, Porter, Diller & Brown
ATTORNEYS

United States Patent Office 3,398,673
Patented Aug. 27, 1968

3,398,673
CLARIFIER
Thomas G. Koplock, 3101 Laurel Lane,
Cheverly, Md. 20785
Filed Oct. 24, 1965, Ser. No. 504,382
4 Claims. (Cl. 99—408)

ABSTRACT OF THE DISCLOSURE

This disclosure has to do with a clarifier particularly adapted for use in conjunction with a cooking vessel utilizing a cooking liquid of the fat and oil class. The clarifier receives the hot cooking liquid from the cooking vessel during the use thereof and continuously removes loose product particles therefrom. A principal feature of the clarifier is that it provides a filter of the type having means for cleaning the same without interrupting the use thereof and the heat of the hot cooking liquid is advantageously utilized to char the removed particles so as to reduce the volume of the removed residue, thereby preventing the clogging of the filter.

---

This invention relates in general to new and useful improvements in cooking vessels, particularly cooking vessels of the deep fat fryer type, and more particularly relates to a novel clarifier for the removal of product particles from the cooking liquids.

The problem of removing loose product particles from cooking liquids is a major problem, particularly when the cooking vessels are continuously operated for many hours at a time. This is particularly true when the cooking vessel is of the deep fat fryer type and the product being cooked is a food product of the type wherein loose particles readily drop therefrom. At the present time, the cost of operating a deep fat fryer in commercial establishments where food products such as potatoes, fish, etc., are being cooked is greatly increased by the necessity of replacing the cooking fat or oil after relatively short use. For example, in large restaurants which operate deep fat fryers for the major portion of every day, the absorption of food particles into the fat or oil is such that either at the end of each day's operation or prior to the beginning of the next day's operation, the used cooking oil fat is passed slowly through a diatomaceous earth to remove to product of food particles from the cooking oil or fat. However, by the time the particles are removed from the oil, many of the particles have been reduced in size to the extent that they cannot be removed by the diatomaceous earth filter and remain in the cooking oil or fat and materially change the color thereof and affect the odor thereof to the extent that the cooking oil or fat must be replaced every third day.

In the past attempts have been made to overcome the aforementioned difficulties by in corporating circulating filter systems in combination with cooking vessels of the deep fat fryer type. However, these prior systems have not proved to be feasible in that either the filter is so complicated that the cost of the clarifier is prohibitive or the filter is of the replaceable type and becomes quickly clogged to the extent that it requires repeated shutdown of the clarifier and time consuming attention.

In view of the foregoing, it is the primary object of this invention to provide a novel clarifier particularly adapted for use with cooking vessels for clarifying the cooking liquids thereof, the clarifier being of a construction wherein it may be readily utilized with cooking vessels of the deep fat fryer type and which will effectively remove product particles, including food particles from the cooking liquid even though the cooking liquid may be of the oil or fat type, and the clarifier being provided with a filter which is capable of continuous use and which may be readily cleansed without interrupting the use of the clarifier.

Another object of this invention is to provide a novel clarifier particularly adapted for use in conjunction with a deep fat fryer for removing loose food particles from the cooking oil or fat thereof, the clarifier having a filter which is of the full flow type wherein continuous filtering of the cooking oil or fat may be accomplished, the filter further being of the type which may be cleaned by merely turning a shaft thereof a few revolutions every several hours and wherein the removed food particles may be readily drained therefrom when there is time available for such draining.

A further object of this invention is to provide a novel clarifier for continuously removing food particles from cooking oil and fats of deep fat fryers, the clarifier including a full flow filter of the type from which particles may be manually cleansed, the filter differing from existing filters in that it is fully encased in insulating material so as to maintain the temperature of the cooking oil or fat within the filter at the high temperature wherein the food particles removed by the filter and entrapped within the housing thereof are carburized by the heat of the cooking oil and the volume of the removed food particles is reduced so as to automatically increase the storage capacity of removed food particles within the filter.

It is also pointed out here that the constant removal of food particles from the cooking oil or fat increases the efficiency of the deep fat fryer and makes it possible to utilize a large percentage of animal fats which are much less expensive than vegetable oils. It is well known that the higher temperature of the cooking oil or fat, the quicker the cooking operation. Thus, it is desirable to maintain the highest possible temperature of the cooking oil or fat. However, the temperature of the cooking oil or fat must be retained below the smoke or flash point of the oil or fat. This smoke point is lowered as the cooking oil or fat begins to absorb the food particles which have a tendency to smoke or carburize at a temperature lower than the smoke or flash point of the cooking oil or fat. Thus, when the food particles are continuously removed from the cooking oil or fat, it will be seen that the desired high temperature of the cooking oil or fat may be continuously maintained and if desired, a larger percentage of animal fat utilized.

With the above and other objects in view that will hereinafter appear, the nature of the invention will be more clearly understood by reference to the following detailed description, the appended claims and the several views illustrated in the accompanying drawing.

In the drawing:

FIGURE 1 is a schematic elevational view showing the clarifier in conjunction with a deep fat fryer.

FIGURE 2 is an enlarged fragmentary sectional view taken through the insulated housing surrounding the filter with portions of the filter being broken away and shown in section.

FIGURE 3 is an enlarged fragmentary horizontal sectional view taken along the line 3—3 of FIGURE 2.

FIGURE 4 is an enlarged fragmentary vertical sectional view taken along the line 4—4 of FIGURE 3.

Referring now to the drawing in detail, it will be seen that there is schematically illustrated in FIGURE 1 a cooking vessel which is generally referred to by the numeral 5. The cooking vessel 5 is filled to a high level with a cooking liquid 6. Although the invention relates generally to cooking vessels of all types, hereinafter, the cooking vessel will be referred to as a deep fat fryer and the cooking liquid will be referred to as a cooking oil or fat. It is to be understood that the deep fat fryer 5 will be provided with suitable heating means to maintain the temperature of the cooking oil or fat at a high temperature. However, the heating means play no part in this invention, and therefore, no attempt has been made to illustrate the same.

It is to be understood that as far as this invention is concerned, the deep fat fryer 5 may be of any type and that the invention pertains to clarifier which is attached to the deep fat fryer 5 for the continued removal of product particles from the cooking liquid 6. The clarifier is generally referred to by the numeral 7.

Basically the clarifier 7 includes an inlet line 8, a pump 9, a filter, which is generally referred to by the numeral 10, and an outlet line 11. The pump 9 draws the cooking oil or fat 6 from the deep fat fryer 5 through the inlet line 8 and delivers it through the filter 10 into the return line 11 and back into the deep fat fryer 5.

The principal component of the clarifier 7 is the filter 10 and accordingly, the filter will be described in more detail first. The filter 10 includes a housing 11' which is hollow and which has an upper portion 12 removably attached thereto as by a screw threaded connection 13. The upper portion 12 is provided with an inlet passage 14 and an outlet passage 15. The inlet passage 14 opens into the interior of the housing 11' in offset relation to the axial center thereof and the outlet passage 15 opens out from the interior of the housing 11' along the axial center thereof. The housing upper portion 12 is internally threaded at the remote ends of the passages 14 and 15 and there is threaded into the outlet passage 14 one end of a line 16 which extends from the pump 9. One end of the return line 11 is threaded into the outlet end of the outlet passage 15.

A filter stack, generally referred to by the numeral 17, is carried by the upper housing portion 12 and extends down into the hollow housing 11'. The filter stack 17 is formed of two groups of sheet or disklike filter elements which are disposed in alternating relation. These filter elements are in closely spaced relation so as to limit the particle size which may pass therebetween. The filter elements include elements 18 which are preferably circular in outline and which have projecting tabs 19 mounting the same on straplike hangers 20. The upper ends of the hangers 20 are suitably secured to the upper housing portion 12. The filter elements 18 have large central openings 21 formed therein.

The filter elements of the second group of filter elements are identified by the numeral 22 and are of a generally pointed configuration, as is clearly shown in FIGURE 3. The central portion of each filter element 22 is in the form of a spider 23 and the filter elements 22 are mounted on a shaft 24. The shaft 24 is disposed along the axial center of the housing 11' and is suitably journalled in a bore 25 formed in the upper housing portion 12. The upper end of the bore 25 is enlarged as at 26 and is sealed by means of a packing nut 27 and suitable packing 28. The shaft 24 is suitably fixed against vertical movement in any desired manner so as to maintain the spacing of the filter elements 22 relative to the next adjacent filter elements 18. It is to be understood that the relative thickness of the filter elements 18 and 22 in FIGURE 4 is greatly exaggerated and that the filter elements 18 and 22 will be of very thin construction and the spacing between the adjacent filter elements will be very small. For most efficient operation in conjunction with food products such as potatoes, fish, etc., it has been found that a spacing on the order of 0.005 inch is most practical.

It is to be noted that the shaft 24 is provided at its upper free end with a handle or knob 29 to facilitate the rotation thereof. The lower end of the housing 11' is provided with a drain valve 30 which may be of any type but which is illustrated as including a housing 31 having an upper portion threaded into the lower end of the housing 11'. The valve housing 31 has rotatably mounted therein in sealed relation a valve member 32 which has connected thereto a stem 33 which carries a handle 34. The valve housing 31 has a passage 35 therethrough and the valve member 32 has a transverse passage 36 which is selectively alignable with the passage 35 to permit flow therethrough.

It is to be noted that a casing 37 completely surrounds the filter 10 with the exception of the handle 29 and the drain valve 30. The casing 37 is filled with a suitable insulating material 38 to maintain the heated condition of the cooking oil or fat disposed within the filter 10. It has been found that the insulating of the filter 10 has a beneficial effect over and above the mere maintaining of the temperature of the cooking oil or fat passing through the clarifier so as to limit the heat loss. This added feature will be described in more detail hereinafter.

Referring now to FIGURE 2 in particular, it will be seen that the oil or fat pumped from the deep fat fryer 5 passes into the filter 10 through the inlet passage 14. This heated oil or fat passes down into the housing 11' around the filter stack 17. While the oil or fat is free to circulate around the filter stack 17, the oil or fat has a tendency to follow the path of least resistance, and accordingly, initially the major portion of the flow of the oil or fat through the filter stack 17 is between the uppermost filter elements of the filter stack 17. As the oil or fat passes between the filter elements of the filter stack 17, all particles having a diameter in excess of 0.005 inch are removed therefrom and the filtered oil or fat passes into the interior of the filter stack 17 and up out through the outlet passage 15. As the removed product particles which are identified by the numeral 40, are removed from the oil or fat, the larger particles fall down around the filter stack 17 to the bottom of the filter housing 11' and the smaller particles are temporarily trapped on the outside of the filter stack 17. As these smaller particles begin to clog the passages between the uppermost elements of the filter stack the oil or fat circulates down further around the filter stack 17 and past between the lower ones of the elements of the filter stack. This downward flow of the oil or fat about the stack 17 has the beneficial function of removing some of the previously adhered particles from the filter stack and at the same time directing the particles more downwardly around the filter stack so as to increase the general movement of the larger particles down around the filter stack to the bottom of the filter.

It is to be understood that the filter does not become completely clogged until the entire filter stack 17 has been encased. It is proposed that the filter 10 be of a size so that this cloggng would not occur under even the most abnormal conditions for a minimum of four hours. With a filter of this size, it is recommended that the filter stack 17 be cleansed hourly, although three consecutive cleanings may be missed without affecting the operation of the filter. The filter stack 17 is cleansed merely by turning the knob or handle 29 so as to rotate the shaft 24 and the filter elements 22 carried thereby. Due to the pointed configuration of the filter elements 22 and the fact that they project radially outwardly beyond the filter elements 18, it will be seen that the product particles impinged against the exterior of the filter stack 17 will be loosened during the turning of the filter elements 22 and removed from the filter stack 17. This can be accomplished by merely turning the shaft 24 several revolutions.

The filter housing 11' has a storage area 41 at the bottom thereof for the entrapped product particles. It will be seen that as the storage area 41 begins to fill, the entrapped product particles may be removed from the filter 10 by merely opening the drain valve 30 to permit the flow of a small quantity of the cooking oil or fat and the product particles 40.

At this time, the additional advantage of insulating the filter 10 is pointed out. Inasmuch as the filter 10 should be of as small a size as possible, it is desired that the storage space 41 be held to a minimum. By maintaining the temperature of the cooking oil or fat within the filter 10 substantially at that within the deep fat fryer 5, it will be seen that the removed food or product particles will be subject to the high temperature of the cooking oil or fat and that carburization of the particles will take place. As the particles are carburized, their volumes will automatically be reduced thereby requiring much less storage space.

It is to be understood that different products have different flotation properties. The particles of some products will float towards the top of the cooking oil or fat whereas the particles of other products will sink towards the bottom. In order that maximum particle removal from the cooking oil or fat may be effected, it is desirable that the cooking oil or fat be removed from the deep fat fryer 5 from that area thereof where the particles collect. To this end, the inlet line 7 is of a divided construction, and includes an upper intake 42 and a lower intake 43 which are interconnected to the remainder of the inlet line 7 by means of a selector valve 44. The ends of the inlets 42 and 43 are of a closed perforated construction as at 45 so as to limit the particle size down into the inlet line 7. In this manner neither the pump 9 nor the filter 10 will be clogged by oversized particles.

The return line 11 is also of a split construction and includes an upper outlet 46 and a lower outlet 47 which are connected to the main part of the return line 11 by means of a selector valve 48. It is to be understood that normally the filtered fat or oil will be returned to the same part of the deep fat fryer 5 as from which the oil is removed.

Although only a preferred embodiment of the invention has been specifically illustrated and described, minor variations may be made in the clarifier without departing from the spirit and scope of the invention, as defined by the appended claims.

I claim:
1. A clarifier particularly adapted for use with a cooking vessel utilizing a cooking liquid of the fat and oil class, said clarifier comprising an inlet line, a pump, a filter and a return line for circulating the hot cooking liquid during the use thereof and continuously removing loose product particles therefrom; the improvement residing in said filter wherein said filter is of the type having means for cleaning the same without interrupting the use thereof, said inlet line including upper and lower inlets and an intermediate selector valve whereby cooking liquid may be selectively taken from an upper portion or a lower portion of a cooking vessel in accordance with the flotation of the product particles.

2. The clarifier of claim 1 wherein said return line has upper and lower outlets and an intermediate selector valve for controlling the zone of return of filtered cooking liquid.

3. A clarifier particularly adapted for use with a cooking vessel utilizing a cooking liquid of the fat and oil class, said clarifier comprising an inlet line, a pump, a filter and a return line for circulating the hot cooking liquid during the use thereof and continuously removing loose product particles therefrom; the improvement residing in said filter wherein said filter is of the type having means for cleaning the same without interrupting the use thereof, said filter being of the strainer type and including a hollow housing, a plurality of sheet-like elements arranged in a stack and separated in closely spaced relation, said elements having central portions thereof removed whereby said stack is hollow and defines a flow passage, said element stack being spaced from said housing whereby liquid flowing through said filter may freely circulate around and through said element stack with particles larger than the spacing between said elements being removed from the liquid and being retained in said housing, and said housing having a drain for periodically discharging collected product particles from said housing, there being two groups of elements in said stack with elements of said two groups being in alternating relation and having a common axis, the elements of one of said groups being fixed and the elements of the other of said groups being rotatable and mounted on a shaft extending axially of said element stack and out through said housing for manual rotation, and said rotatable elements having portions projecting radially outwardly beyond said fixed elements whereby product particles impinged on the exterior of said stack are removed therefrom when said rotatable elements are rotated, said inlet line including upper and lower inlets and an intermediate selector valve whereby cooking liquid may be selectively taken from an upper portion or a lower portion of a cooking vessel in accordance with the flotation of the product particles, and said return line having upper and lower outlets and an intermediate selector valve for controlling the zone of return of filtered cooking liquid.

4. The clarifier of claim 3 wherein said inlet line includes a strainer for limiting the size of particles entering into said clarifier.

References Cited

UNITED STATES PATENTS

| | | | |
|---|---|---|---|
| 2,029,611 | 2/1936 | Chewning | 210—357 |
| 2,227,344 | 12/1940 | Hartmann | 210—357 |
| 2,287,396 | 6/1942 | Roth | 99—403 X |
| 2,578,129 | 12/1951 | Daugherty | 99—408 |
| 2,814,389 | 11/1957 | Hoare | 210—357 |
| 3,097,589 | 7/1963 | Moore | 99—408 |
| 3,124,122 | 3/1964 | Baron | 99—406 |
| 3,159,095 | 12/1964 | Wagner | 99—408 |
| 3,280,722 | 10/1966 | Rahauser | 99—408 |
| 1,938,934 | 12/1933 | Scott | 210—357 |
| 3,063,259 | 11/1962 | Hankison | 165—119 X |

BILLY J. WILHITE, *Primary Examiner.*